(12) United States Patent
Hochmuth (10) Patent No.: US 8,763,014 B2
(45) Date of Patent: Jun. 24, 2014

(54) PROGRAM GENERATED NOTIFICATION CONTROL

(75) Inventor: Roland M. Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1853 days.

(21) Appl. No.: 11/669,336

(22) Filed: Jan. 31, 2007

(65) Prior Publication Data
US 2008/0184267 A1 Jul. 31, 2008

(51) Int. Cl.
*G06F 9/44* (2006.01)
*G06F 9/46* (2006.01)

(52) U.S. Cl.
USPC .......................................................... 719/318

(58) Field of Classification Search
USPC .......................................................... 719/318
See application file for complete search history.

(56) References Cited

U.S. PATENT DOCUMENTS

| | | | |
|---|---|---|---|
| 7,260,390 B1* | 8/2007 | Skinner et al. | 455/420 |
| 8,140,127 B2* | 3/2012 | Luo | 455/567 |
| 2004/0205142 A1* | 10/2004 | Bahr | 709/207 |
| 2007/0078905 A1* | 4/2007 | Gunther et al. | 707/201 |
| 2007/0300183 A1* | 12/2007 | Anttila et al. | 715/808 |
| 2008/0052545 A1* | 2/2008 | Finkelstein et al. | 713/300 |

* cited by examiner

*Primary Examiner* — Andy Ho
*Assistant Examiner* — Abdou Seye (57) ABSTRACT

A method is disclosed that comprises a control program receiving a notification control request from a user (the notification control request specifying whether to enable or disable the generation of notifications by a first user application program); identifying a software interface associated with the first user application program and used to enable and disable the generation of notifications by the first user application program; and using the identified software interface and based upon the control request received (selectively enabling and disabling generation of notifications by the first user application program).

12 Claims, 8 Drawing Sheets

PROGRAM GENERATED NOTIFICATION CONTROL

BACKGROUND

As computers have continued to improve, users have continued to increase the number of software application programs that they concurrently run on such computers. Many of these programs generate notifications such as pop-up message windows, event notifications, and alarms. The proliferation of such programs has thus resulted in a commensurate proliferation of notifications generated by the programs. If a user wishes to disable such notifications (either temporarily or indefinitely), the user unfortunately must do so on a program-by-program basis. If the user additionally uses other devices running programs that perform similar functions and that are synchronized with programs executing on the above-described computer system (e.g., a contact list on a personal digital assistant or "PDA" that is synchronized with Microsoft® Office Outlook®), duplicate notifications increase the number of notifications that must be handled by the user. Notifications from each program executing on the device must also be individually disabled if the user wishes to reduce the number of such notifications. The task of disabling (and subsequently re-enabling) notifications is made even more time-consuming when one considers that, for many programs, the option to enable or disable notifications may be buried deep within the menu tree of each program, and may differ from program to program.

BRIEF DESCRIPTION OF THE DRAWINGS

For a detailed description of illustrative embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer system or a portion of a computer system. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

Figure 1:
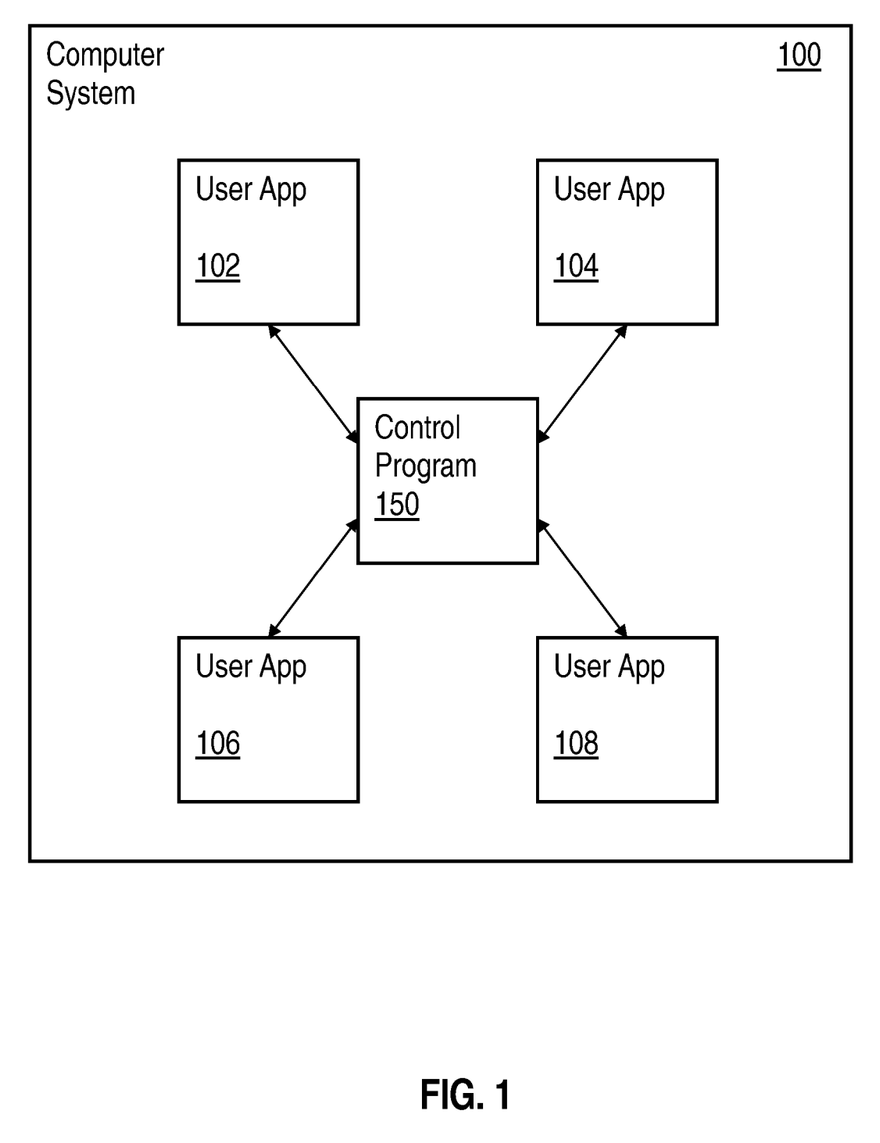
FIG. 1 shows a computer system comprising a control program interacting with user application programs, in accordance with at least some illustrative embodiments.

Today's computer systems enable users to concurrently run a multitude of programs. Each of these programs generate a number of notifications in the form of status, event, alert and alarm messages, which may be presented to the user visually on the display device or a status panel, audibly through an audio system within the computer, or using a combination of all of the above methods. Examples of such program notifications include Desktop Alerts generated by Microsoft® Office Outlook®, and new message notifications generated by instant messaging (IM) programs (e.g., Jabber®). FIG. 1 shows a computer system 100 executing multiple user application programs (User App 102, 104, 106, and 108), and also executing a control program 150 that interacts with the user application programs 102-108, in accordance with at least some illustrative embodiments. Control program 150 provides the user with centralized control of the presentation of notifications generated by each of the user application programs 102-108. In this manner a user, with relatively few (e.g., one) clicks of a button, can enable and/or disable the presentation of many or, if desired, all messages, alarms and events generated by the user application programs executing on the computer system 100.

Execution of control program 150 may be initiated by the user as a control application program (similar to user application programs 102-108), or by the operating system as a control service program (sometimes referred to as a "system service") upon initial operating system startup. Although the present disclosure describes control program 150 executing within a Microsoft® Windows® environment, those of ordinary skill in the art will appreciate that control program 150 can be implemented to operate within any number of computer operating systems (e.g., Linux, OpenVMS, and HP-UX) on any number of implementations of computer system 100 (e.g., desktop and laptop personal computers, workstations, and servers), and that all such implementations of control program 150 are intended to be within the scope of the present disclosure.

Figure 2A:
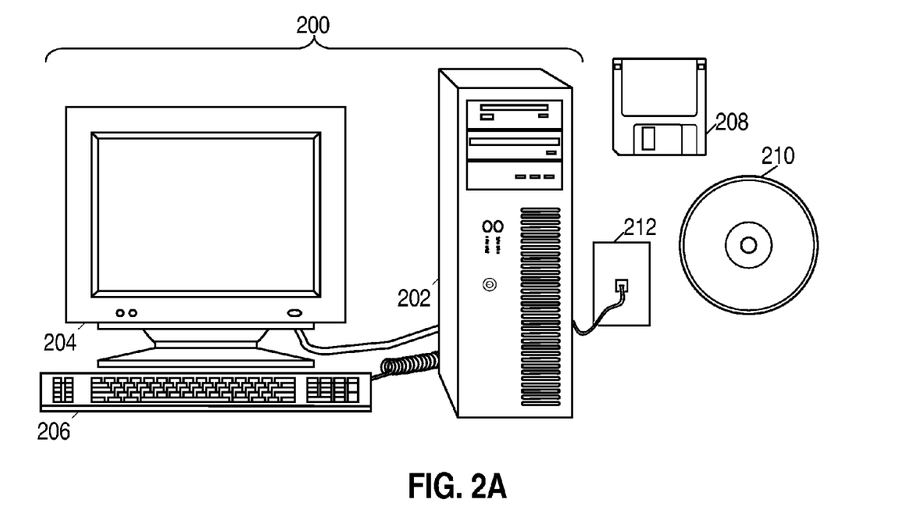
FIG. 2A shows an example of a system configuration, suitable for use as the computer system of FIG. 1, and constructed in accordance with at least some illustrative embodiments.
Figure 2B:
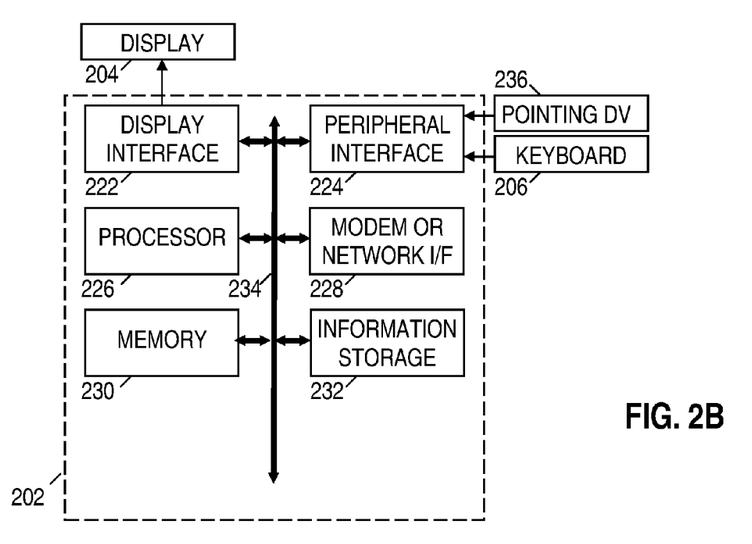
FIG. 2B shows a block diagram of the system configuration of FIG. 2A, in accordance with at least some illustrative embodiments.

FIGS. 2A and 2B show an illustrative system configuration 200 suitable for implementing the computer system 100 of FIG. 1. As shown, the illustrative system configuration 200 includes a chassis 202, a display 204, and an input device 206. The chassis 202 includes a processor 226, memory 230, and storage 232. Memory 230 comprises a computer readable medium such as random access memory (RAM), read-only memory (ROM), flash RAM, and combinations thereof. Storage 232 comprises a computer readable medium such as flash RAM, a hard disk drive, a compact disk read-only memory (CD-ROM), and combinations thereof. The computer readable media of both memory 230 and storage 232 comprises, for example, software that is executed by processor 226 and provides computer system 100 with some or all of the functionality described herein. The chassis 202 also includes a network interface 228 that enables the system 200 to receive information via a local area network and/or a wired or wireless wide area network, represented in FIG. 2A by Ethernet jack 212. The chassis 202 is coupled to the display 204 and the input device 206, through which a user interacts with the system. The display 204 and the input device 206 may together operate as a user interface. The input device 206 is shown as a keyboard, but other input devices such as a mouse or a keypad may also be included.

The chassis 202 may also comprise include a display interface 222, a peripheral interface 224, and a bus 234. System 200 may be a bus-based computer, with the bus 234 interconnecting the various elements. The display interface 222 may comprise a video card or other suitable display interface that accepts information from the bus 234 and transforms it into a form suitable for the display 204. Conversely, the peripheral interface 224 may accept signals from the keyboard 206 and other input devices such as a pointing device 236, and transform them into a form suitable for communication on the bus 234.

The processor 226 gathers information from other system elements, including input data from the peripheral interface 224, and program instructions and other data from storage 232 or memory 230, or from other systems coupled to a local area network or a wide area network via the network interface 228. The processor 226 carries out the program instructions and processes the data accordingly. The program instructions may further configure the processor 226 to send data to other system elements, comprising information for the User which may be communicated via the display interface 222 and the display 204. The network interface 228 enables the processor 226 to communicate with other systems via a local area network or via a wide area network. The memory 230 may serve as a low-latency temporary store of information for the processor 226, and the information storage device 232 may serve as a long term (but higher latency) store of information.

The processor 226, and hence the computer 200 as a whole, operates in accordance with one or more programs stored on the information storage device 232 or received via the network interface 228. The processor 226 may copy portions of the programs into the memory 230 for faster access, and may switch between programs or carry out additional programs in response to User actuation of the input device. The additional programs may be retrieved from the storage device 232 or may be retrieved or received from other locations via the network interface 228. One or more of these programs executes on system 200 causing the system to perform at least some of the notification control functions of control program 150 as disclosed herein.

Figure 3:
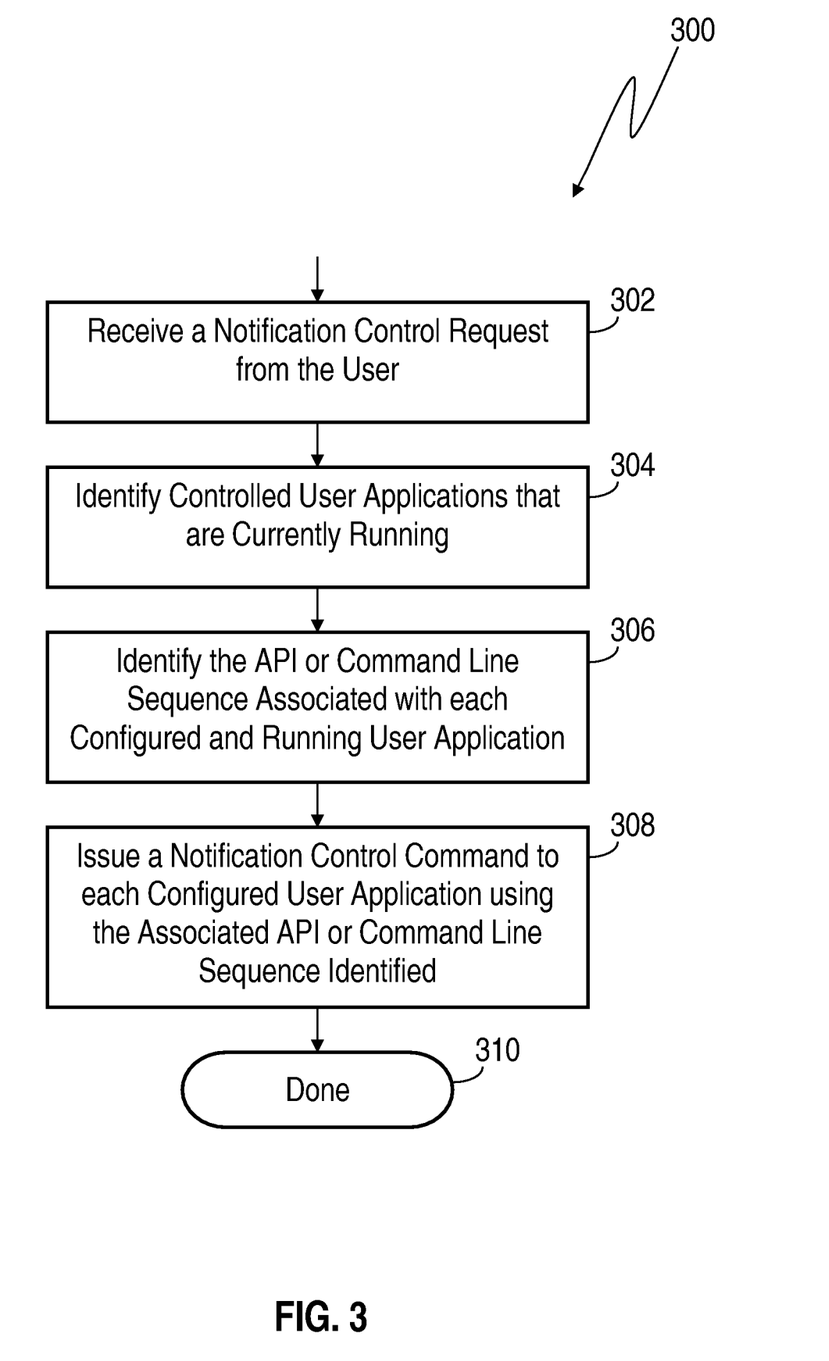
FIG. 3 shows a method for implementing a control program as a control application program, in accordance with at least some illustrative embodiments.

As already noted, the control program 150 of FIG. 1 may be implemented as either a control application program run by the user, or as a control service program run automatically by the system at startup. FIG. 3 shows a method 300 implementing the control program 150 of FIG. 1 as a control application program, in accordance with at least some illustrative embodiments. After the control program has been started by the user, the control program receives a notification control request from the user (block 302 of FIG. 3). The request indicates whether the user wishes to enable or disable the presentation to the user of notifications from the user application programs that the control program is configured to control. In the illustrative embodiment of FIG. 3, the presentation to the user of the notifications is enabled and disable by enabling and disabling the generation of the notification by the user application program.

The list of applications controlled by the control program may be configured dynamically by the user or read from a configuration file saved in non-volatile storage (e.g., a hard disk) within the computer system 100 of FIG. 1. In at least some illustrative embodiments implemented in a Microsoft® Windows® environment, the Windows Registry can be scanned for COM compliant application programs that have registered themselves. The list of controlled user application can then be built based on the results of the scan. Other techniques for setting up, saving and storing the configuration of the control program will become apparent to those skilled in the art, and all such techniques are intended to be within the scope of the present disclosure.

The notifications generated by the user application programs may be presented to the user in many ways. This includes status messages provided in pop-up windows, audible alerts and alarms presented through speakers either inside or coupled to a personal computer or workstation, visual indications via flashing icons on a display or flashing lights and/or LEDs on a panel, and events presented on a display as taskbar information balloons (e.g., a new mail notification generated by Microsoft® Office Outlook® which appears adjacent to the Office Outlook® icon in the notification are of the task bar in Microsoft® Windows®. Other techniques for presenting notifications to a user that are generated by software programs will become apparent to those of ordinary skill in the art, and all such techniques are intended to be within the scope of the present disclosure.

The requests received by the control program are generated by the user via input devices such as those shown in FIG. 2 and described above. An operating system, such as for example Microsoft® Windows®, provides an environment in which the user interface of the control program 150 of FIG. 1 provides the user with the ability to generate notification control requests. For example, in at least some illustrative embodiments the program is configured to be displayed as an icon in the system tray, where the enable and disable commands, as well as configuration options, are provided to the user in a short menu by right-clicking on the control program icon displayed. In at least some other illustrative embodiments, the control program 150 displays enable and disable buttons within a dedicated window which can be activated by the user by clicking on the appropriate button. In still other illustrative embodiments, a "mute" button is displayed which toggles between a "muted" and "not muted" state when clicked. Other user interface configurations will become apparent to those of ordinary skill in the art, and all such configurations are intended to be within the scope of the present disclosure.

Continuing to refer to FIG. 3, once a request is received by the control program, the controlled user application programs that are currently running are identified (block 304). An application program interface (API), or a command line sequence submitted through a command line interface (via the operating system), is subsequently identified for each user application program controlled by the control program (block 306). The APIs are software interfaces (generally in the form of library function calls) that are provided by the creator of the user application program. Alternatively, the control program may identify a command line interface (and associated command line sequence) as the software interface that is used to communicate with the user application programs. In still other illustrative embodiments that utilize a central Registry (e.g., Microsoft® Windows®), a notification enable/disable flag can be saved in a Registry key and can subsequently be checked by the user application to determine if notifications should be presented to the user. Other software interfaces that may be use by the control program to communicate with the user application programs will become apparent to those of ordinary skill in the art (e.g., TCP/IP sockets, remote procedure calls, and mailboxes), and all such software interfaces are intended to be within the scope of the present disclosure.

Each software interface identified by the control program is used to enable or disable the generation of notifications by each associated user application program. Once the control program has identified the interface to be used with each controlled user application program, individual notification control commands, either enabling or disabling the generation of notifications, are sent to each controlled user application using the appropriate software interface (block 308), completing the method 300 (block 310). In this manner a single control request from the user enables or disables the generation of notifications by an entire group of user application programs. Although the method 300 as described above enables and disables the generation of notifications from all of the controlled user application programs that are executing, those skilled in the art will recognize that it is also possible to define sub-groups of user application programs and to issue notification generation enable and disable requests for such sub-groups.

Figure 4A:
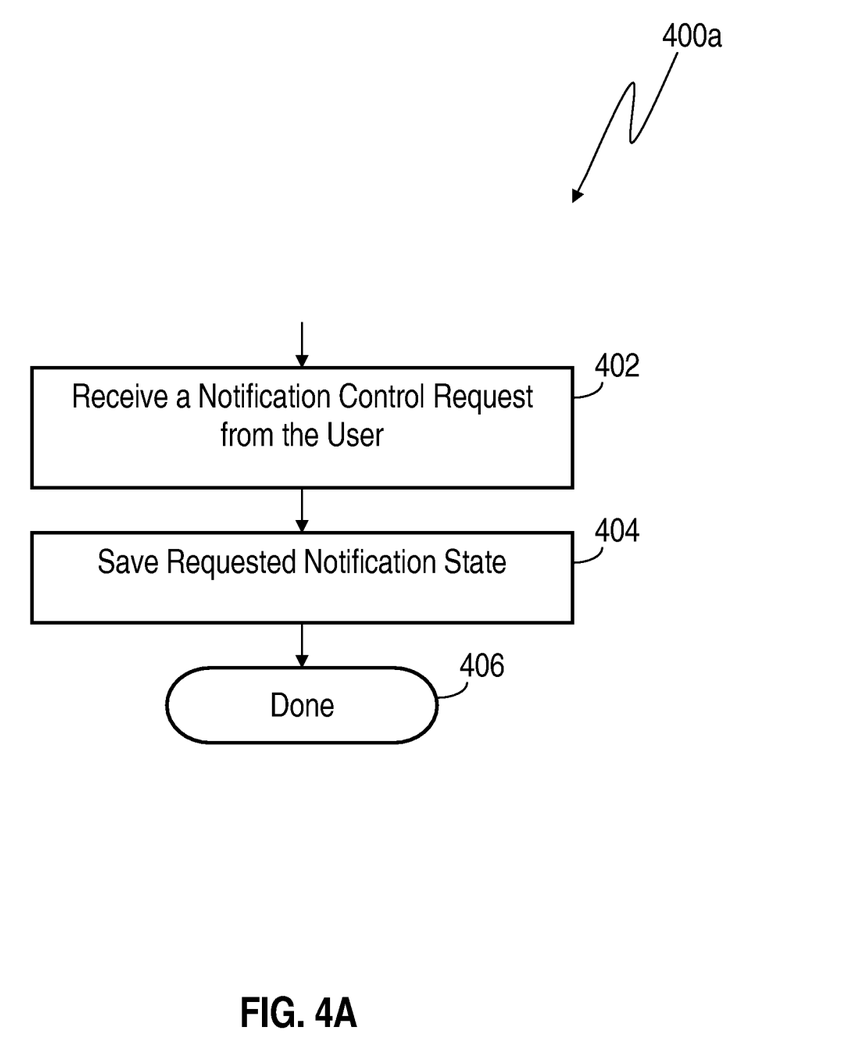
FIGS. 4A and 4B show a method for implementing a control program as a control service program, in accordance with at least some illustrative embodiments.
Figure 4B:
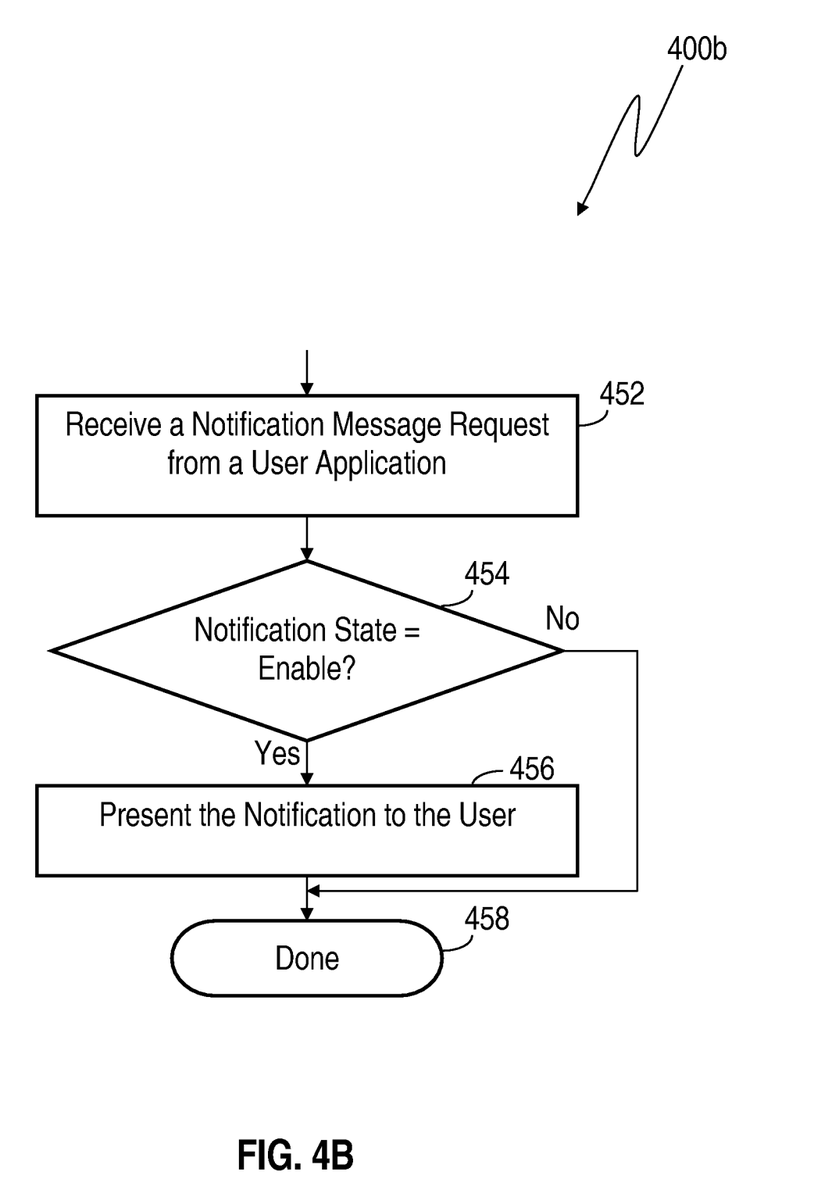

FIGS. 4A and 4B show methods 400a and 400b respectively, which together comprise a method for implementing the control program 150 of FIG. 1 as a control service program, in accordance with at least some illustrative embodiments. In such embodiments, the creators of the user application programs of FIG. 1 provide an option that enables the user to configure such programs to send notification message requests to the control program 150, rather than generating and presenting the notifications directly to the user. Referring to FIG. 4A, in the first stage of method 400, and after the control program begins execution, a notification control request from the user is received by the program (block 402). The request selects whether the generation of notifications is to be enabled or disabled. The specific notification state requested (e.g., enabled or disable) is specified within the notification control request as, for example, a bit field within said request. The value of the requested notification state is saved (e.g., as a binary value) within the data space of the control program (block 404), completing the first stage of method 400 (block 406).

Once a notification request has been processed according to the first stage of method 400 (method 400a), subsequent notification message requests are received and processed according to the second stage of method 400 (method 400b) as shown in FIG. 4B. As noted above, each user application program (102-108, FIG. 1) is individually configured to send notification message requests (e.g., status, event, and alarm message requests) to control program 150 of FIG. 1, rather than generating and presenting the notifications directly to the user. Continuing to refer to FIG. 4B, after a notification message request is received from a user application program (block 452), the state of the control request (previously saved in method 400a) is checked to determine if the notification is to be presented to the user (block 454). If the notification state is set to "enabled" (indicating that notifications to the user are to be enabled), the notification is generated and presented to the user by the control program (block 456), completing the method (block 458). If the notification state is set to "disabled" (indicating that notifications to the user are to be disabled), the method is completed without further action (block 458). As with the user application embodiments of control program 150 of FIG. 1, the user application programs may be configured into sub-groups for which notifications may then be enabled and disabled together.

Control program 150, whether implemented as a control application program or as a control service program, in at least some embodiments is a stand-alone application that is executed independent of the execution order of the user application programs associated with the controlled notifications. As such, control program 150 operates independently of the user application programs, and not as a sub-system of the user application programs. Likewise, the user application programs are not sub-systems of control program 150 in such embodiments.

Figure 5A:
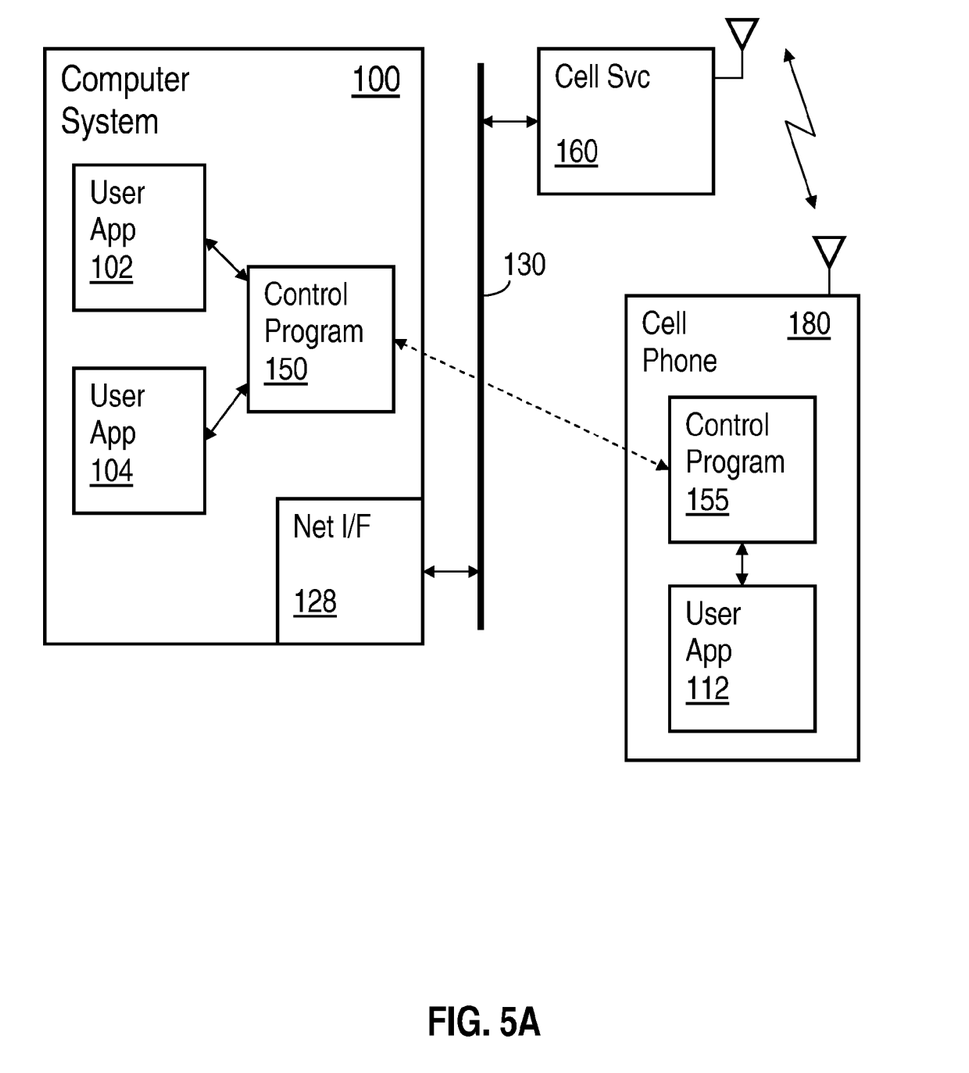
FIG. 5A shows multiple control programs communicating across a network, in accordance with at least some illustrative embodiments.

Although the above-described embodiments are presented in the context of a single control program enabling and disabling notifications on a single computer system, other embodiments are possible that use multiple control programs configured in a peer-to-peer configuration in which notifications are enabled and disabled for groups of associated systems and devices. FIG. 5A shows an example of such associated systems and devices, in accordance with at least some illustrative embodiments. As before, a control program 150 and multiple user application programs (User App 102 and 104) execute on a computer system 100, which also comprises a network interface (Net I/F) 128 coupled to network 130 (e.g., the Internet). Cellular telephone (Cell Phone) 180 is shown, which also runs a control program 155, similar to control program 150. User application program (User App) 112 also runs on cellular telephone 180, and interacts with control program 155.

Cellular telephone 180 communicates wirelessly with network 130, through cellular service provider (Cell Svc) 160, which is coupled to network 130. In this manner, control programs 150 and 155 communicate with each other and exchange information, as indicated by the embodiment in FIG. 5A. Thus, a request to enable or disable notifications that is originated by a user on cellular telephone 180 is provided to both control programs 150 and 155, thereby resulting in notifications from all of the user applications on both computer system 100 and cellular telephone 180 being enabled or disabled, per the user's request. Likewise, a request originated on computer system 100 is also propagated by control program 150 to control program 155, resulting in notifications from all of the user application programs (here user application programs 102, 104, and 112) being enabled or disabled as requested. As before, sub-groups may be defined that include less than all of the user application programs.

Figure 5B:
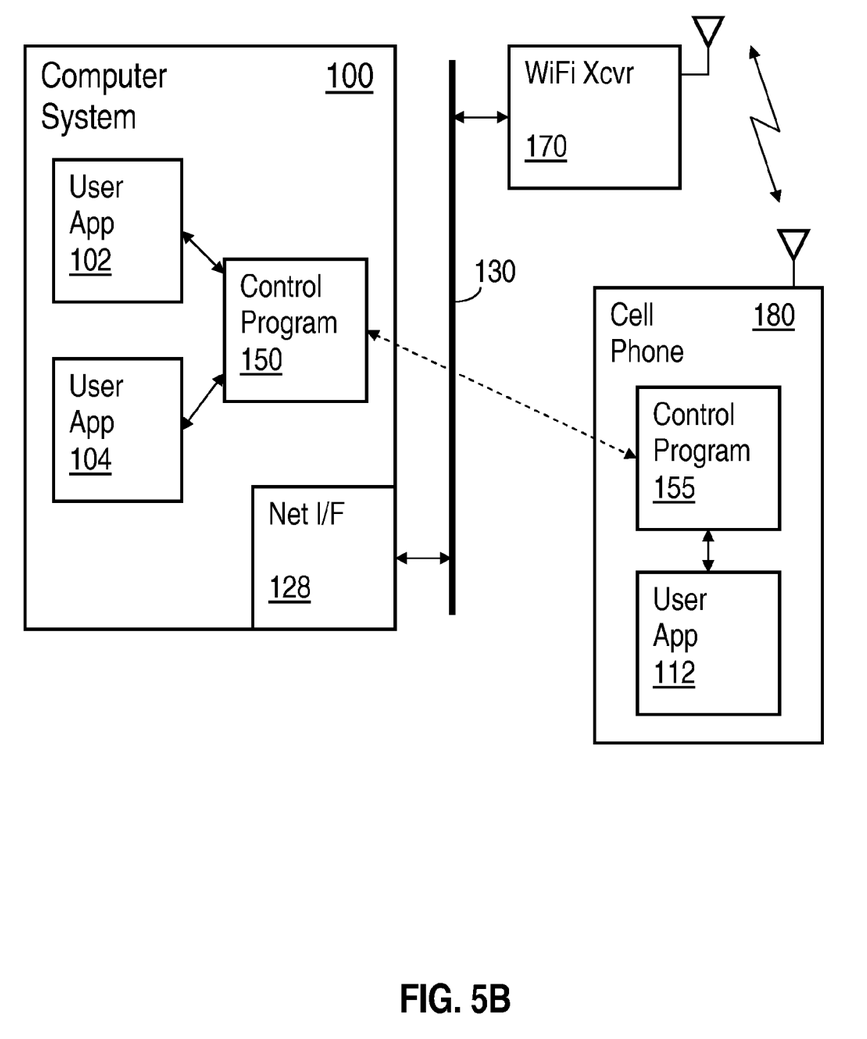
FIG. 5B shows multiple control programs communicating across a local Wi-Fi network, in accordance with at least some illustrative embodiments.
Figure 5C:
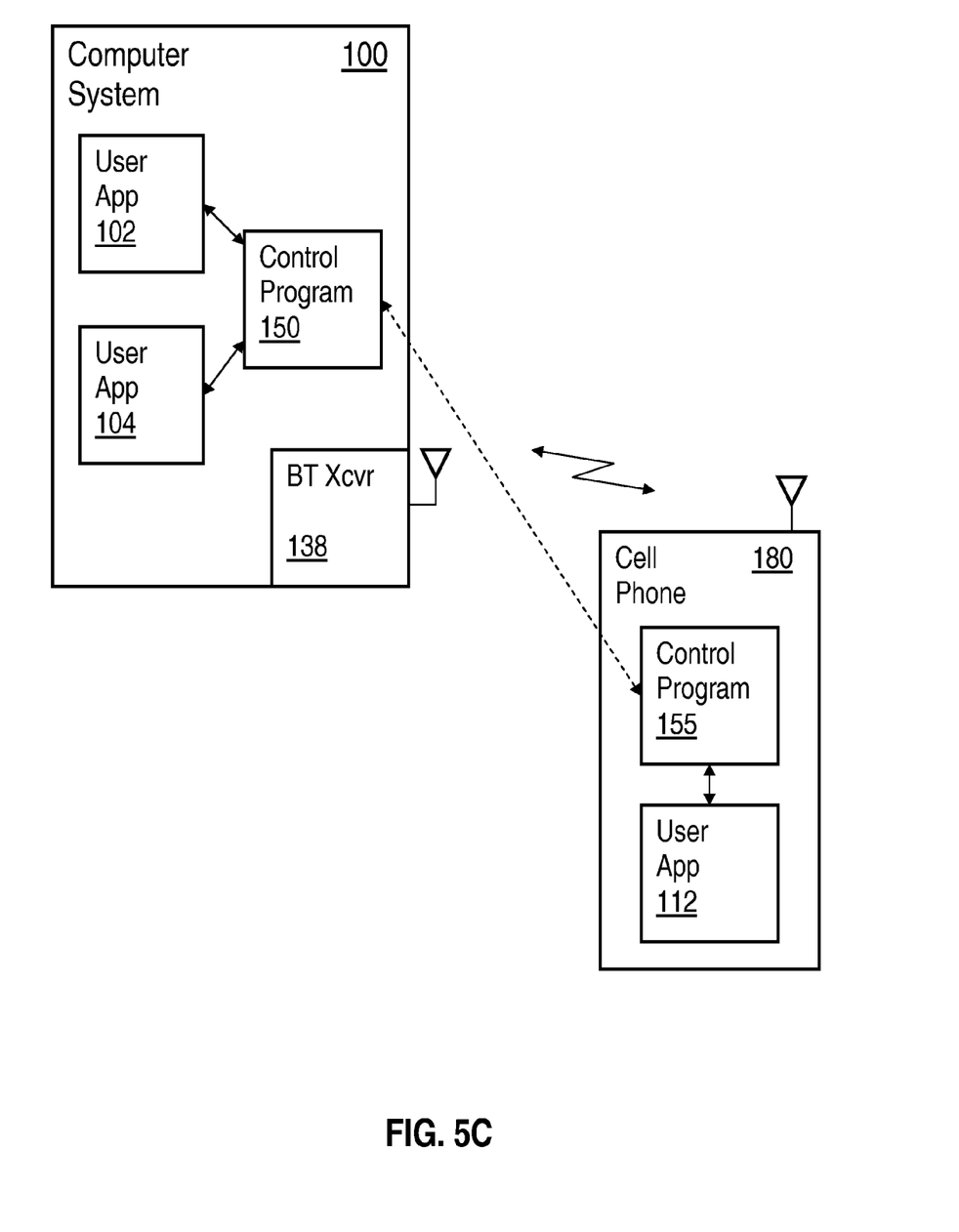
FIG. 5C shows multiple control programs communicating using a Bluetooth interface, in accordance with at least some illustrative embodiments.

FIGS. 5B and 5C show other illustrative embodiments that comprise different configurations for enabling communications between computer system 100 and cellular telephone 180 (and thus between control program 150 and control program 155). In FIG. 5B, cellular telephone 180 is a wireless fidelity or "Wi-Fi" enabled device (e.g., IEEE 802.11b, 802.11g, and 802.11n) that communicates with wireless access point 170, which is coupled to network 130 (e.g., a local area network). This configuration provides a communication path between control programs 150 and 155, enabling the user to enable and disable notifications from user applications executing on either computer system 100 or cellular telephone 180. The illustrative embodiment of FIG. 5C also enables the user to use either system or device to enable or disable notifications, but this time Bluetooth transceiver (BT Xcvr) 138 within computer system 100 allows communication with Bluetooth-enabled cellular telephone 180, thus providing the communications interface between control programs 150 and 155.

The above discussion is meant to be illustrative of the principles and various embodiments of the present invention. Numerous variations and modifications will become apparent to those skilled in the art once the above disclosure is fully appreciated. For example, although a cellular telephone is shown to illustrate the interaction of multiple control programs running on multiple systems, other similar devices such as personal digital assistants (PDAs) may also be used. Further, notification tiers may be defined wherein only notifications at a particular tier, or at or below a particular tier, are enabled or disabled together, based on a tier indicator within the control request. It is intended that the following claims be interpreted to embrace all such variations and modifications.

What is claimed is:

1. A method, comprising:
    a control program receiving input from a user defining a sub-group of user application programs;
    the control program receiving a notification control request from the user, the notification control request specifying whether to enable or disable the generation of notifications by the defined sub-group of user application programs;
    identifying a software interface associated with each of the user application programs in the defined sub-group and used to enable and disable the generation of notifications by such user application programs; and
    using the identified software interface and based upon the control request received, selectively enabling and disabling generation of notifications by user application programs in the defined sub-group.

2. The method of claim 1, wherein the software interface comprises an application program interface (API) of the user application programs.

3. The method of claim 1, further comprising limiting the identifying of the software interface to user application programs that are executing.

4. The method of claim 1, further comprising:
    associating the notification with a notification tier; and
    selectively enabling and disabling the generation of the notification further based upon a tier indicator within the control request.

5. The method of claim 1, wherein the software interface comprises a command line interface.

6. A system, comprising:
    a processor;
    a plurality of user application programs configured to execute on the processor, wherein each user application program is configured to generate notifications; and
    a control program configured to execute on the processor to:
        receive input from a user to define a subset of the user application programs;
        receive a notification control request from the user, wherein the notification control request specifies whether to enable or disable the generation of notifications by the defined sub-group of user application programs;
        identify a software interface associated with each of the user application programs in the defined sub-group and used to enable and disable the generation of notifications by such user application programs; and
        based upon the control request received, use the identified software interface to selectively enable and disable generation of notifications by user application programs in the defined sub-group.

7. The system of claim 6, wherein the software interface comprises an application program interface (API) of the user application program.

8. The system of claim 6, wherein the control program further associates a notification with a notification tier; and further selectively enables and disables generation of the notification further based upon a tier indicator within a control request.

9. The method of claim 6, wherein the software interface comprises a command line interface.

10. A computer-readable storage medium comprising software executable on a processor that causes the processor to:
    receive a notification control request from a user, the notification control request specifying whether to enable or disable the generation of notifications by user application programs;
    identify a software interface of each of the user application programs usable to enable and disable the generation of notifications by the user application programs;
    use the identified software interface in each user application program to selectively enable and disable generation of notifications by the user application programs; and
    permit the user in the notification control request to specify a subset of the user application programs for enabling and disabling generation of notifications.

11. The computer-readable storage medium of claim 10, wherein the software interface comprises an application program interface (API) of the user application program.

12. The computer-readable storage medium of claim 10, wherein the software interface comprises a command line interface.

* * * * *

UNITED STATES PATENT AND TRADEMARK OFFICE
CERTIFICATE OF CORRECTION

PATENT NO.        : 8,763,014 B2                                              Page 1 of 1
APPLICATION NO.   : 11/669336
DATED             : June 24, 2014
INVENTOR(S)       : Roland M. Hochmuth It is certified that error appears in the above-identified patent and that said Letters Patent is hereby corrected as shown below:

In the Claims:

In column 7, line 23, in Claim 1, after "disable" delete "the".

In column 7, line 32, in Claim 1, delete "by" and insert -- by the --, therefor.

Signed and Sealed this
Seventh Day of October, 2014

Michelle K. Lee
*Deputy Director of the United States Patent and Trademark Office*